United States Patent [19]
Rotenberg et al.

[11] Patent Number: 5,187,946
[45] Date of Patent: Feb. 23, 1993

[54] APPARATUS & METHOD FOR INDIRECT EVAPORATIVE COOLING OF A FLUID

[76] Inventors: Yefim Rotenberg, 38 Voorhis Dr., Old Bethpage, N.Y. 11804; Mitchel T. Wolfe, Roger Canoe Hollow Rd., Mill Neck, N.Y. 11765

[21] Appl. No.: 765,920

[22] Filed: Sep. 24, 1991

[51] Int. Cl.$^5$ .............................................. F25D 7/00
[52] U.S. Cl. .................................... 62/314; 165/166; 261/153; 62/121
[58] Field of Search ................ 62/304, 309, 310, 316, 62/121, 314; 165/166; 261/153, DIG. 3

[56] References Cited

U.S. PATENT DOCUMENTS

| | | | |
|---|---|---|---|
| 1,142,483 | 6/1915 | Braemer et al. | 236/44 C |
| 2,174,060 | 10/1937 | Niehart | 261/11 |
| 3,820,353 | 6/1974 | Shiraishi et al. | 62/305 |
| 4,002,040 | 1/1977 | Munters et al. | 62/121 |
| 4,112,027 | 9/1978 | Cates | 261/251 |
| 4,372,897 | 2/1983 | Sanderson et al. | 261/153 |
| 4,380,910 | 4/1983 | Hood et al. | 62/91 |
| 4,544,513 | 10/1985 | Otterbein | 261/153 |
| 4,660,390 | 4/1987 | Worthington | 62/309 |
| 4,708,832 | 11/1987 | Norback | 261/153 |
| 4,793,152 | 12/1988 | Naderi | 62/311 |
| 4,827,733 | 5/1989 | Dinh | 62/305 |
| 4,910,971 | 3/1990 | McNab | 62/310 |
| 4,976,113 | 12/1990 | Gershuni et al. | 62/314 |
| 4,994,211 | 2/1991 | Fuller | 261/97 |
| 5,003,961 | 4/1991 | Besik | 126/110 R |
| 5,050,391 | 9/1991 | Tsimerman | 62/94 |

FOREIGN PATENT DOCUMENTS 571669 11/1978 U.S.S.R. .

Primary Examiner—Henry A. Bennet
Assistant Examiner—William C. Doerrler
Attorney, Agent, or Firm—Hopgood, Calimafde, Kalil, Blaustein & Judlowe

[57] ABSTRACT

An apparatus and method for indirect cooling of air from its ambient temperature to substantially its dew point. Ambient air is redirected through spaced openings formed along the heat exchanger plates to form a secondary air stream.

10 Claims, 4 Drawing Sheets

APPARATUS & METHOD FOR INDIRECT EVAPORATIVE COOLING OF A FLUID

FIELD OF INVENTION

This invention relates generally to an apparatus and method for indirectly cooling a fluid by evaporation, and more specifically, to an apparatus and a method for cooling air from its ambient temperature to substantially its dew point.

BACKGROUND OF THE INVENTION

At present, air is commonly cooled by air conditioners that employ energy consuming refrigeration machines. These machines are of a relatively complicated design, and are mechanically unreliable and costly to operate. In many instances, the simpler alternative technique of evaporative cooling can be used for cooling purposes.

Many methods and apparatus are known that employ evaporative processes for cooling various fluids. In particular, evaporative processes are often used to cool atmospheric air. These processes exploit the various physical properties of the atmosphere for extracting heat therefrom.

The atmosphere is a mixture of air and water vapor. The temperature of the atmosphere, as indicated by a normal thermometer, is the dry-bulb temperature (td). If the atmosphere is cooled under a constant total pressure, the partial pressures remain constant until a temperature is reached at which condensation begins. This temperature is the dew point (tc) or condensation temperature. Heating and cooling above the dew point entails no condensation of vapor. If the bulb of a thermometer is covered with absorbent material, e.g., linen, wet with distilled water, and exposed to the atmosphere, evaporation will cool the water and the thermometer to the wet-bulb temperature (tw). This is the temperature given by a psychrometer. The wet-bulb temperature lies between the drybulb temperature and the dew point. The difference between the wet-bulb temperature and the dry-bulb temperature is the psychometric differential. These three temperatures, the drybulb temperature, the wet-bulb temperature and the dew point, are distinct from each other except in an atmosphere saturated with water vapor, in which they are identical. The drier the atmosphere, the more these temperatures are different from one another.

Moisture can be absorbed by a body of air until that body of air becomes saturated. When moisture evaporates from a surface and is absorbed by a body of air, the surface from which the moisture evaporates is cooled. This is called evaporative cooling. The cooled surface can then be used to cool something else, for example, to cool another body of air. This is achieved by extracting heat from that body of air.

However, evaporate cooling techniques are limited by the moisture absorbing capacity of the ambient air. Thus, in very humid climates, the amount of moisture that the ambient air can absorb, and thus cool a surface, is limited. Conversely, in those limited climatic zones that have ambient air with an exceedingly low moisture content, evaporative cooling is a low energy, economically feasible alternative to air conditioning. By exploiting the physical thermal characteristics of the atmosphere, the ambient air can be cooled, and comfort enhanced.

DESCRIPTION OF THE PRIOR ART

A wide variety of apparatus and methods have been developed to cool air using evaporative techniques. However, each of these techniques has several concomitant disadvantages. For example, U.S. Pat. No. 2,174,060 is directed to an air conditioning apparatus for evaporatively cooling air, which has alternating wet and dry channels. These channels are formed by the arrangement of the wet and dry surfaces of the heat exchanger plates. The plates act as heat exchanging surfaces. The ambient air is directed into the dry channels. At the end of the dry channel the air stream is split into two streams; a main stream and a secondary stream. The main stream is directed to the user. The secondary stream is redirected 180° into the wet channels, counterflow to the entering common air stream. The secondary stream becomes moistened and heated by absorbing the heat from the entering common air stream. The heated, moistened secondary air stream is then redirected 90° and discharged outside.

This apparatus has several disadvantages. When the entering common air stream is redirected through the circuitous route having 270° of turns, substantial aerodynamic losses result. In addition, the counter-flow heat exchange technique that occurs between the entering common air stream and the secondary air stream has low efficiency.

U.S. Pat. No. 4,002,040 discloses another method and apparatus for cooling air by evaporative cooling. The method disclosed in this patent also cools air by using wet and dry sides of a heat exchanging surface for forming wet and dry channels. Ambient air is directed into the dry channels. At the end of the dry channel, the air is divided into two streams, a discharge stream and a secondary stream. The discharge stream is directed to the user. The secondary stream is redirected through 270° into the wet channels. The secondary stream picks up moisture therethrough, and is discharged to the atmosphere.

This method and apparatus also have several disadvantages. When the secondary stream is redirected through 270°, aerodynamic losses occur. These losses result in high static pressure. Such high static pressure requires a large fan to overcome these losses. In addition, a constant air flow is maintained through the entire length of the dry channel. This constant air flow has dead zones where stagnant air pockets develop. The stagnant pockets of air reduce the heat transfer efficiency of the channels. Further, this method and device employs laminar air flow, which has low heat-transfer efficiencies.

The inefficient heat transfer between the entering common air streams and the secondary streams of the aforementioned devices necessitate an apparatus having large overall dimensions. Moreover, in both of these devices, the secondary air streams are discharged to the atmosphere through a sole discharge port. The sole discharge port results in substantial head losses, with a consequent increase in energy consumption.

Soviet Patent No. 571,669 is also directed to an apparatus for indirectly evaporatively cooling air. The apparatus disclosed therein incorporates a sealed enclosure having a collection pan and plate type heat transfer surfaces. Each side of each plate consists of a capillary material which covers approximately 50% of the plate surface. Typically, the lower half of one side of the plate and the upper half of the other side of the plate.

The plates are arranged one against another thereby creating alternating wet and dry channels. A fan at the end of the channels directs ambient air through the dry channels toward the user. The ends of the wet channels which are exposed to the fan are sealed, and opposite ends of the wet channels are open so that the air flowing therethrough is discharged to the atmosphere. In addition, at the top of each wet channel, near the sealed end, opening vents discharge secondary air to the atmosphere. After the air stream passes through the dry channels and is cooled, it is separated into two streams, a discharge stream to the user, and a secondary stream which enters the wet channel without changing its direction of flow. The secondary stream is vented to the atmosphere by turning 90° through the opening vents.

This apparatus has several disadvantages. By using baffles to create multiple supply and discharge openings, a sizable amount of energy is consumed. Further, an inefficient method of transferring heat is used by employing a counter-flow between the primary air stream and the secondary air stream. Moreover, the size of the heat transfer plates is limited by the natural limit of capillary action to moisten the wet channels. Thus, all of the above-described methods and apparatus employing indirect evaporation for cooling an air stream suffer from a variety of disadvantages. Chief among these disadvantages are poor heat transfer efficiency and relatively high energy consumption.

SUMMARY OF THE INVENTION

In accordance with this invention, there is provided an improved method and apparatus for effectively overcoming the aforementioned difficulties and the long standing problems inherent in evaporatively cooling air. These problems have been solved in a simple, convenient, and highly effective way.

It is therefore an object of this invention to provide an apparatus for efficiently cooling a stream of ambient air.

In the method and apparatus of the present invention, the ambient air is indirectly cooled by a stream of secondary air. The stream of secondary air is redirected away from the stream of ambient air within the apparatus. The apparatus comprises a dry channel means for cooling the ambient air stream and for conducting the ambient air stream in a straight path from the atmosphere to the user.

The apparatus of the present invention also comprises a wet channel in a heat exchange relationship with the dry channel means. The wet channel has an aperture therethrough in communication with the dry channel. The aperture redirects the secondary air stream away from the ambient air stream and conducts the secondary air stream into and through the wet channel. The wet channel has discharge ports located at opposite sides thereof for discharging the secondary air stream to the atmosphere.

The apparatus of the present invention further comprises a wetting means for keeping the wet channel wet so that as the secondary air stream flows therethrough, the secondary air stream can absorb moisture therefrom. The apparatus also comprises an air supply means for supplying air to the apparatus. As the ambient air stream passes through the dry channel means, the ambient air stream is cooled by the dry channel means. The dry channel means is cooled by the secondary air passing through and absorbing moisture from the wet channel means.

Additional objects of the present invention will become apparent from the following description. The method and apparatus of the present invention will be better understood by reference to the following detailed discussion of specific embodiments and the attached figures which illustrate and exemplify such embodiments.

DESCRIPTION OF THE DRAWINGS

A specific embodiment of the invention will be described with reference to the following drawings wherein.

DETAILED DESCRIPTION OF THE INVENTION

Figure 1:
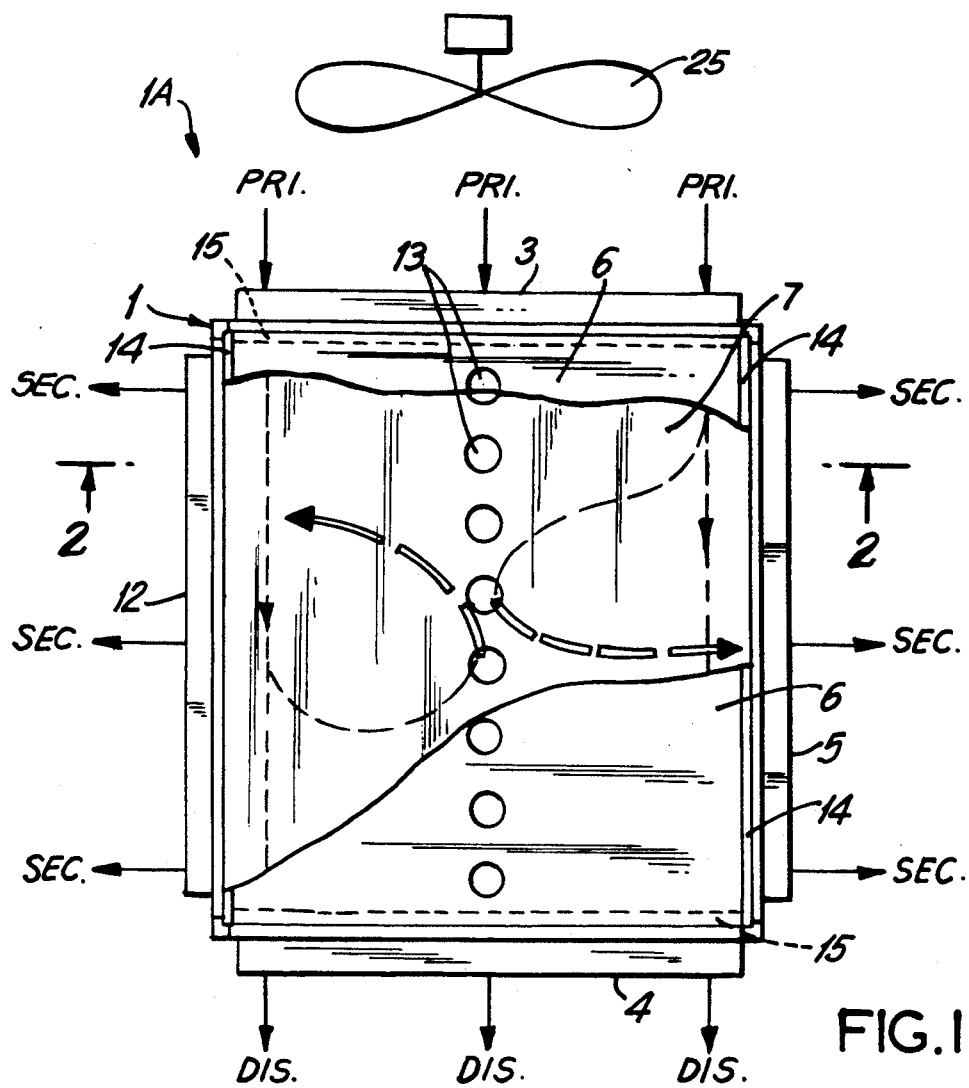
FIG. 1 is a plan cut away view of the apparatus of the present invention.

The following preferred embodiment as exemplified by the drawings is illustrative of the invention and is not intended to limit the invention as encompassed by the claims of the application. An apparatus and method for indirectly evaporatively cooling the ambient air to its dew point is disclosed herein. As will be appreciated by those persons skilled in the art, a major advantage provided by the present invention is cooling air by utilizing a simple, efficient apparatus which has a high efficiency, uses a minimum of energy, and consumes a minimum of space.

The apparatus IA, as illustrated generally in FIGS. 1-4 has an enclosure or housing 1. At the lower portion of the enclosure 1 is a collection pan 2. The pan 2 collects excess water for recirculation and/or disposal. One side 3 of the enclosure is adapted for the intake of the ambient air. Directly opposite the intake side 3 of the enclosure are the discharge openings 4. The cooled ambient air is discharged to the user through the discharge openings 4. The ambient air stream flows in a straight path from the intake side 3 to the discharge openings 4 propelled by a fan 25. As the ambient air flows from the intake 3 to the discharge openings, the ambient air flows through dry channels 10 formed by heat transfer plates 6 and 7. One side 8 of the heat transfer plates 6 and 7 are dry and watertight. The dry channels 10 are formed by the dry side 8 of the heat transfer plates. The ambient air is cooled by flowing through the dry channels 10.

The other side of the heat transfer plates 6 and 7 have a porous capillary surface 9. The porous capillary surface 9 is maintained in a wet condition. Wet channels 11 are formed by the wet side, i.e., the porous capillary surface 9 of the heat transfer plates. The dry channels 1, which cool the ambient air stream, are in turn, cooled by transferring heat to the wet channels 11.

Through openings or apertures 13 are provided along the length of the dry channels 10 and the wet channels 11 for communication therebetween. A portion of the ambient air stream which flows through the dry channels 10 is split away therefrom and is redirected through the apertures 13 into the wet channel 11. This redirected air stream is referred to as the secondary air stream. The secondary air stream splits away from the ambient air stream due to a pressure differential between the dry and wet channels. When the secondary air stream is redirected through the aperture 13, the secondary air stream passes through and is discharged at both sides 5 and 12 of the wet channel 11. As the secondary air stream flows through the wet channel 11 toward the discharge openings 5 and 12, moisture is absorbed from the porous capillary surface 9. As moisture is absorbed therefrom, the surface is cooled thereby cooling the dry channels 10. The moisture laden secondary air stream which flows perpendicular to the ambient air stream is then discharged through the discharge openings 5 and 12 of the wet channel 11 to the atmosphere. By discharging the secondary air at both ends of the wet channel, the exhaust velocity is reduced with the accompanying reduction in aerodynamic losses.

The wet channels are maintained in a moist condition by means of a perforated spray header 16 located at the top of the enclosure 1. As water is discharged from the spray header 16, it is drawn into the wet channels 11 through the apertures 13 and spreads upon the porous capillary surfaces 9 as a very thin equally distributed film. Due to the dynamic pressure of the secondary air stream, the water does not enter the dry channels 10. Further, the dry channels 10 have sides 14 which are sealed parallel to the movement of the ambient air stream. The wet channels 11 have ends 15 which are sealed on the sides parallel to the movement of the secondary air stream.

Figure 7:
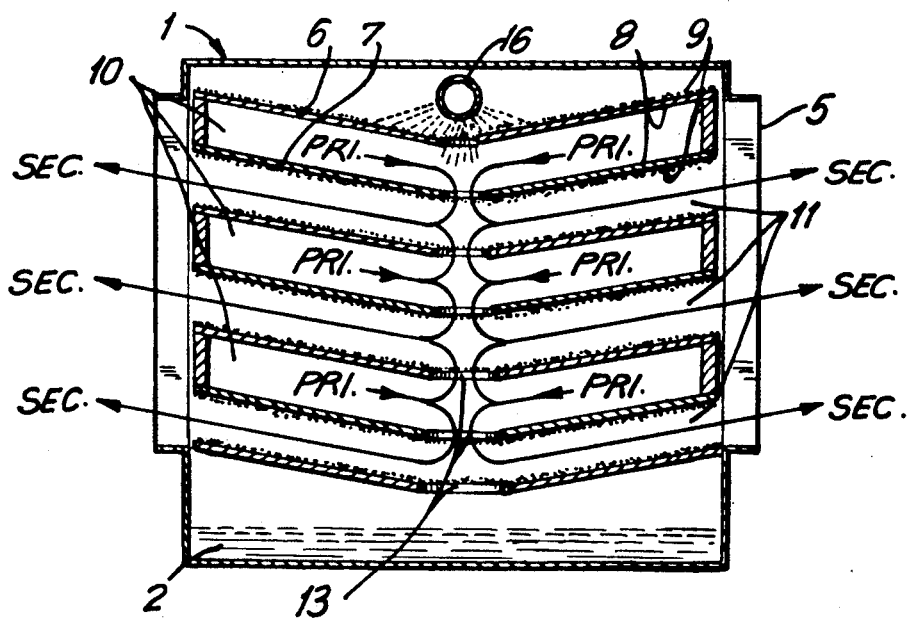
FIG. 7 is a plan cut away view of an alternate embodiment of the apparatus of the present invention.
Figure 2:
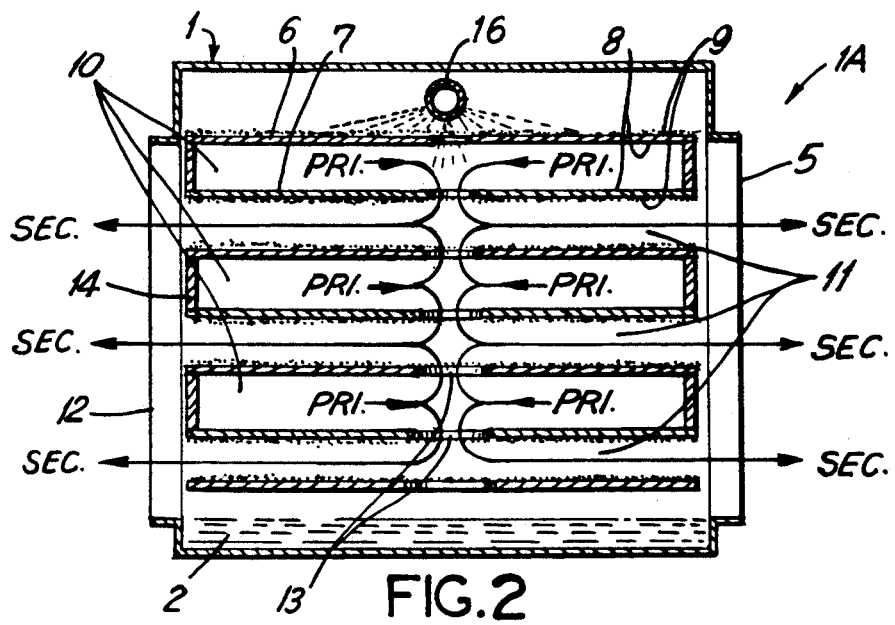
FIG. 2 is a section of the apparatus taken along section line A—A of FIG. 1.
Figure 3:
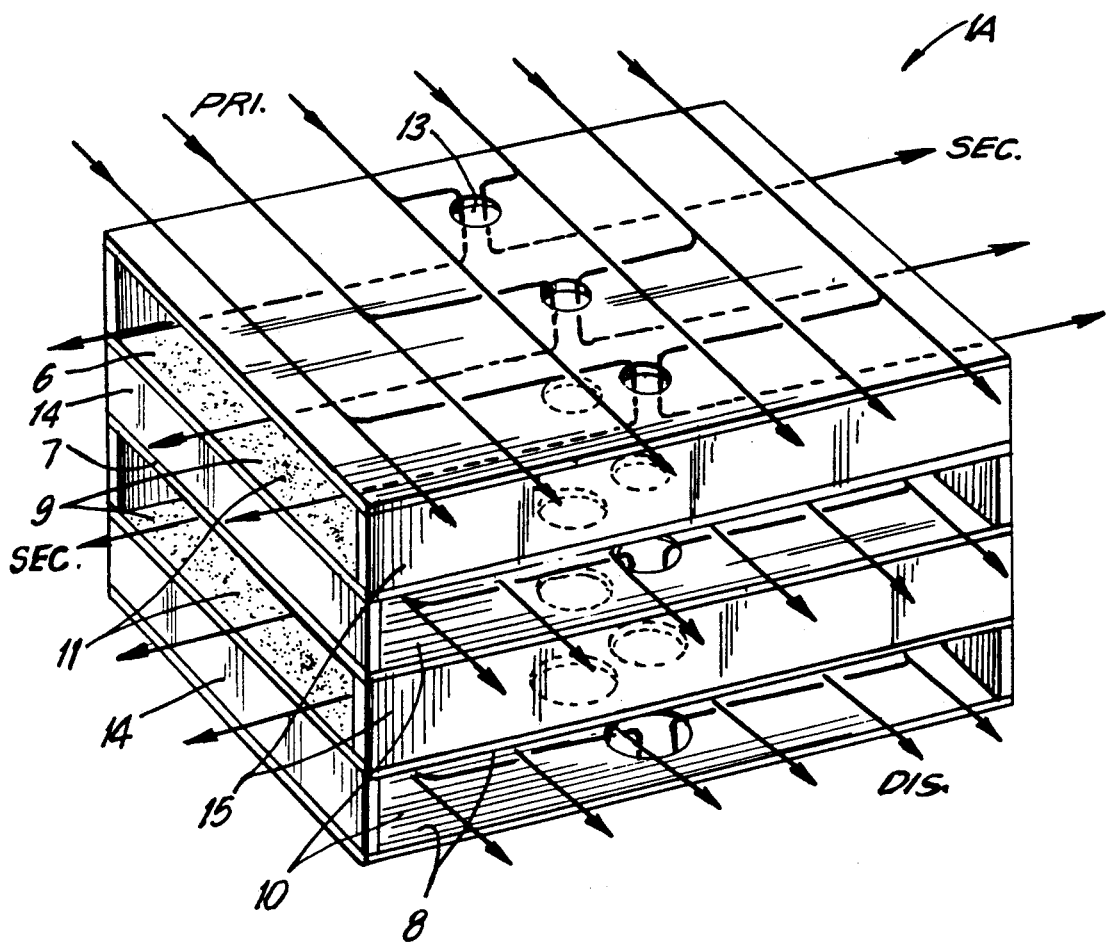
FIG. 3 is an orthogonal representation of the apparatus.

In order to further facilitate water distribution, the heat transfer plates 6 and 7 may be placed in an inclined position. FIG. 7 illustrates the heat transfer plates in the inclined position. The plates should be inclined towards the through openings. The inclination of the heat transfer plates may range from approximately 5° to a maximum of about 30°. Preferably, the heat transfer plates should incline from about 5° to about 10° toward the through openings. Providing inclined plates prevents moisture droplets from accumulating around the through openings and from entering the dry channels. Inclined plates further allow excess water in the wet channels to drain more easily to the bottom of the unit.

Thus, dry ambient air is directed by the fan 25 into the dry channels 10. A portion of the ambient air stream is diverted through the openings 13 from the dry channels 10 into the wet channels 11. The openings 13 are particularly sized for diverting about 40% to about 60% of the entering ambient air stream from the dry channels 10 into the wet channels. It has been found that apertures aerodynamically sized for diverting about 50% of the entering air stream from the dry channels to the wet channels are suitable.

The secondary air stream thus diverted into the wet channel 11 moves perpendicular to the ambient air stream. As the secondary air stream absorbs moisture from the wet channels, the heat of evaporation of the heat transfer surfaces is removed. In this way, the dry channels are cooled. In turn, the dry channel cools the air stream flowing therethrough to a temperature approaching the dew point temperature while maintaining a constant moisture content.

Therefore, the temperature of the secondary air entering the wet side of the heat transfer surface will be lower than the temperature of the ambient air entering the apparatus. Consequently, the temperature of the secondary air during evaporation of the moisture from the wet channels will be lower than the wet-bulb temperature of the ambient air entering the apparatus. As a result, the lower temperature limit of the wet channel will be the dew point of the air entering the apparatus. Similarly, the dry channels will also be cooled to a temperature approaching the limit of the dew point thereby cooling the air directed to the user down to its dew point temperature.

By varying the size, shape, and relative positions and locations of the through openings in the plates, greater heat transfer efficiencies can be realized in the wet channels. It is optimal to have a thin completely wet surface in the wet channels. Such a thin, completely wet surface will evaporate quickly and uniformly. However, this is difficult to achieve in practice. In order to approach a thin, equally evaporating surface in the wet channels, the proper sizing and placement of the through openings is a design consideration. For example, by increasing the size of the holes as one progresses in the direction of air flow, one can approach optimal conditions for heat transfer. Similarly, holes which are elongated in the direction of the air flow can be provided. Optionally, an increase in the number of equally sized holes in the direction of air flow can also be provided. Any combination of holes so provided can achieve the design criteria necessary to the heat transfer efficiencies desired.

It has been further found that various materials can be used for the porous capillary surface of the heat exchanges plates. For example, non-organic fibers such as polyester, olefin, and nylon, either in fabric form or flocking can be used. These materials are typically bonded to an impermeable substrate such as metal or plastic. Another suitable material is porous plastic in sheet form. Porous plastic may comprise plastic granules, such as PVC, which remain permeable although fused together. An impermeable backing such as paint or thin plastic film is added to the porous plastic.

Thus, major pre-existing problems have been overcome and benefits heretofore unrealized have been achieved. By exhausting the secondary air through discharge openings at both sides of the wet channels only half of the flow volume is discharged through either opening. This reduces the exhaust velocity and therefore reduces aerodynamic losses and associated power consumption. By gradually and sequentially diverting the secondary air stream into the wet channels a turbulent air flow is created in the dry channels. This turbulence effectively increases the heat transfer efficiency between the wet and dry channels and between the dry channels and the air stream cooled by the dry channels. This increase in heat transfer efficiency directly results in an apparatus providing a cooling capacity requiring smaller overall dimensions than have been previously achieved.

Figure 5:
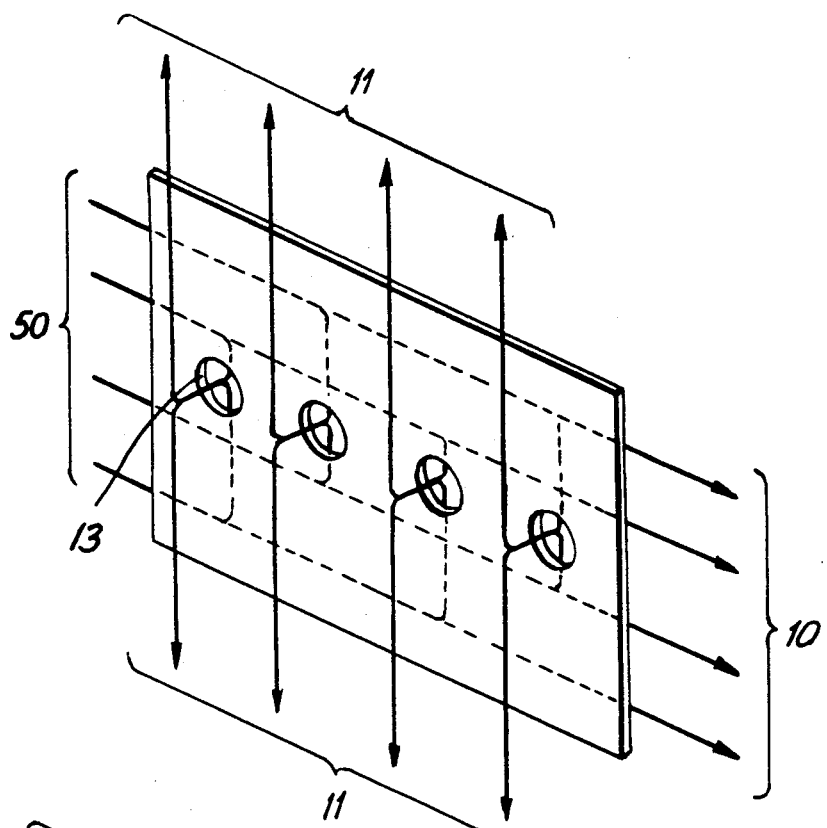
FIG. 5 is schematic representation of the flow path of the apparatus of the present invention as viewed from the wet channel.
Figure 6:
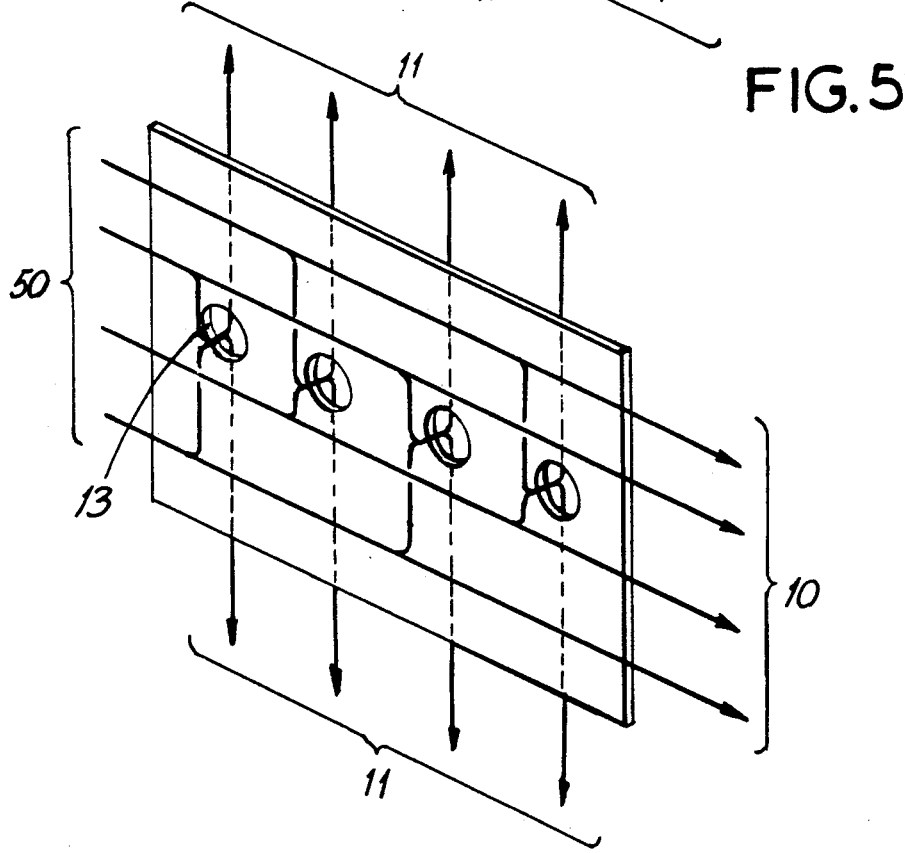
FIG. 6 is a schematic representation of the flow path of the apparatus of the present invention as viewed from the dry channel.

A prophetic example of the invention as illustrated in FIGS. 5 and 6 is as follows. If the ambient air stream 50 enters the apparatus at 240 m$^3$/hr having a dry-bulb temperature of 35.1° C. and a wet-bulb temperature of 22.6° C., the stream 50 flows through the dry channel formed by the dry side of the heat transfer surfaces. As the stream 50 moves through the dry channel, the dry-bulb temperature of the stream is reduced to 19.1° C. and the wet-bulb temperature of the stream is reduced to 17.6° C. without changing its moisture content. As the ambient air stream flows through and is cooled by the dry channel, approximately 119 m³/hr is redirected as the secondary air stream through the openings 13 into the wet channel. As the secondary air stream flows through the wet channel towards the discharge openings, the secondary air stream will absorb moisture from the wet channels and its dry-bulb temperature will increase to 29.2° C. and its wet-bulb temperature will increase to 26.8° C. The remaining portion of the ambient air stream will be discharged from the dry channels to the user at 121 m³/hr with a dry-bulb temperature of 19.1° C. and a wet-bulb temperature of 17.6° C. The aerodynamic losses of the total air streams from inlet to discharge is 105 pa. A 12 watt fan propels the air. The total surface area of the heat transfer surface is 0.672 m³.

COMPARATIVE EXAMPLE

For purposes of comparison, the apparatus disclosed in U.S. Pat. No. 4,002,040 was used to cool a stream of ambient air having the same approximate thermal characteristics. An incoming ambient air flow of 238 m³/hr having a dry-bulb temperature of 34.9° C. and a wet-bulb temperature of 22.5° C. was directed to an equal surface area of 0.672 m². The redirected secondary air stream was 115 m³/hr resulting in 123 m³/hr directed to the user. When this apparatus was employed as taught, aerodynamic losses of 280 pa resulted and necessitated a 35 watt fan. The air directed to the user had a dry-bulb temperature of 19.8° C. and a wet-bulb temperature of 17.9° C.

The following table summarizes the above comparison.

fluid can be conveyed by a pump or blower through the dry channel for cooling. By using such a system the main apparatus can be located outdoor and the additional heat exchanger can be located indoors. This system further increases heat transfer and reduces energy consumption using a further evaporative cooling process.

It is to be understood that the above-described representation of the present invention is not intended to restrict the present invention since many more modifications may be made within the scope of the claims without departing from the spirit thereof.

We claim:

1. An apparatus for cooling a stream of ambient air by a secondary stream of air comprising:
   (a) a dry channel for cooling the ambient air stream and for conducting the ambient air stream in a straight path from the atmosphere to the user;
   (b) a wet channel in a heat exchange relationship with said dry channel;
   (c) means interposed between said wet and dry channels for progressive and sequentially redirecting a portion of the ambient air stream between said wet and dry channels and for creating a secondary air stream which moves into and through said wet channel, said wet channel including a discharge port at its end for discharging the secondary air stream to the atmosphere;
   (d) wetting means for keeping said wet channel wet so that as the secondary air stream flows through said wet channel, the secondary air stream can absorb moisture therefrom; and
   (e) air supply means for supplying air to the apparatus so that as the ambient air stream passes through said dry channel, the ambient air stream is cooled by the dry channel and said dry channel is cooled by the secondary air passing through and absorbing moisture from said wet channel.

2. The apparatus of claim 1, wherein the flow of the secondary air stream comprises the range of about 40% to about 60% of the incoming ambient air stream.

3. The apparatus of claim 2, wherein the flow of the secondary air stream comprises about 50% of the incoming ambient air stream.

4. The apparatus of claim 1, further comprising a second heat exchanger wherein the second heat exchanger has a dry channel and a wet channel therethrough in heat transfer relationship therebetween wherein said wet channel of said second heat exchange is in communication with said dry channel of the apparatus.

5. The apparatus of claim 1, wherein said communication between said wet channel means and said dry channel means comprises apertures, and wherein the number of said apertures increase along the stream of air directed to the user.

TABLE #1

| | Method of testing Air Flow, M3/U | | | Temperature, degree C | | | | | | Press. drop Pa. | Energy req.d. | Heat transfer surface M3 |
|---|---|---|---|---|---|---|---|---|---|---|---|---|
| | Primary air | Discharge air | Secondary air | Primary air db | Primary air wb | Discharge air db | Discharge air wb | Secondary air db | Secondary air wb | | | |
| 1. Claimed Method | 240 | 121 | 119 | 35.1 | 22.6 | 19.1 | 17.6 | 29.2 | 26.8 | 105 | 12 | 0.672 |
| Known Method | 238 | 123 | 115 | 34.9 | 22.5 | 19.8 | 17.9 | 27.8 | 26.0 | 280 | 35 | 0.672 |
| 2. Claimed Method | 239 | 120 | 119 | 26.1 | 16.3 | 12.9 | 11.0 | 22.6 | 20.7 | 104 | 12 | 0.672 |
| Known Method | 241 | 124 | 117 | 26.3 | 16.4 | 14.8 | 11.9 | 22.1 | 20.3 | 278 | 35 | 0.672 |

Figure 4:
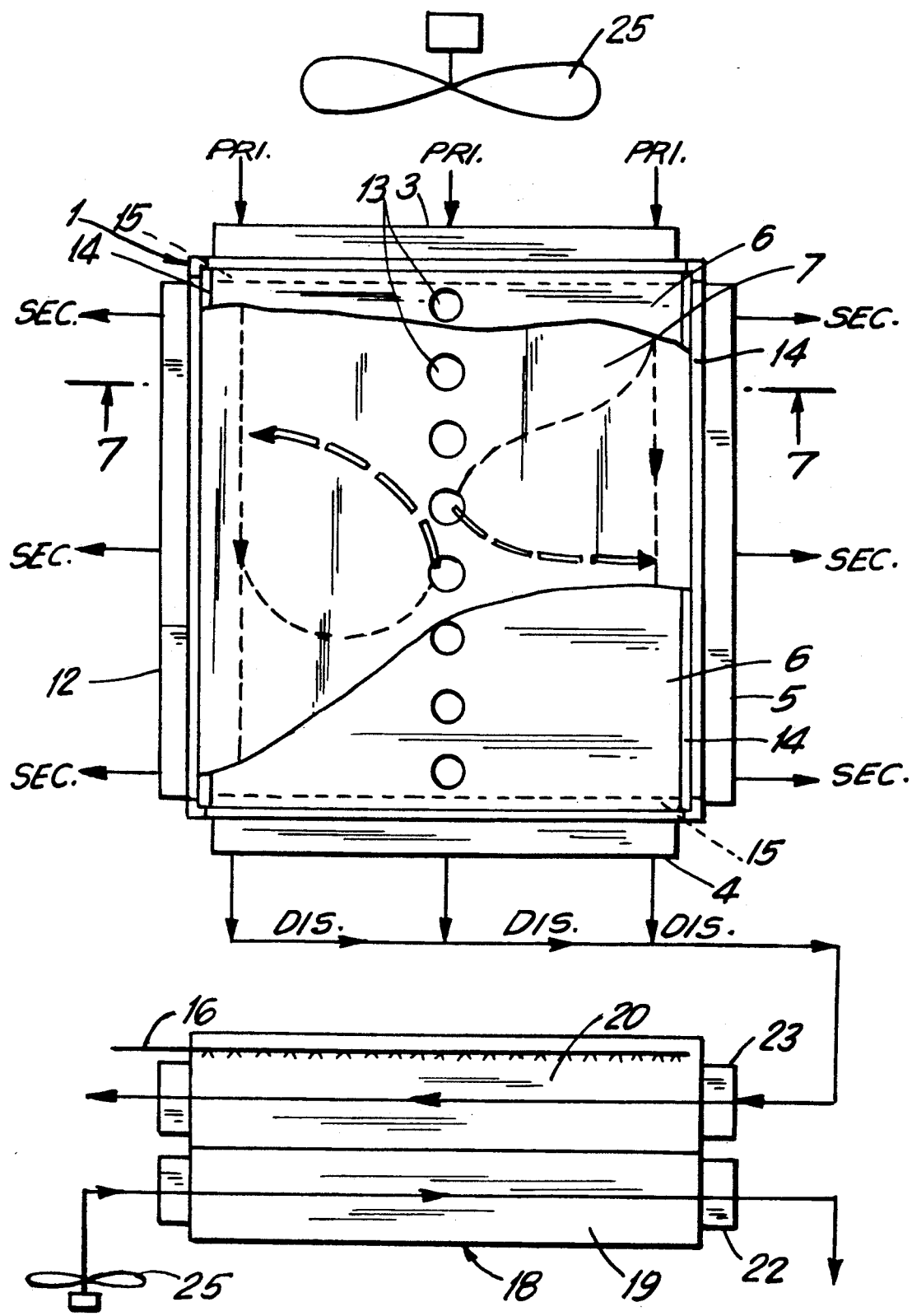
FIG. 4 is a plan cut-away view of an alternate embodiment of the apparatus of the present invention.

Additional performance benefits can be realized when the present invention is equipped with an additional heat exchanger 18 as illustrated in FIG. 4. The additional heat exchange 18 has a dry channel 19 and a wet channel 20. The wet channel 20 has a inlet opening 23.

The cooled air exiting the dry channels 10 of the apparatus is directed to the inlet opening 23 of the wet channel 20 of the additional heat exchanger 18. Water is supplied to the wet channels for keeping it moist. The air passing through the wet channels 20 is discharged to the atmosphere. The dry channel 19 of the additional heat exchanger is connected in a recirculating loop to the area to be cooled. Air is pumped through the additional heat exchanger by a supplementary fan 25 by either blowing or withdrawing air through the dry channel 19. In this way, air can be further cooled to its dew point.

In the system as illustrated in FIG. 4, 100% recirculated air can be directed through the dry channels of the additional heat exchange. In fact, not only air, but any 6. A method for cooling a stream of ambient air by a secondary stream of air comprising the steps of:
  (a) cooling the ambient air stream and conducting the ambient air stream in a straight path from the atmosphere to the user by a dry channel;
  (b) cooling said dry channel by a wet channel in a heat exchange relationship therewith, said wet channel being in communication with said dry channel;
  (c) redirecting a portion of the ambient air stream from said dry channel through a plurality of spaced apertures formed in a plate located between said wet and dry channels into and through said wet channel and discharging the thus-created secondary air stream through both ends of said wet channel into the atmosphere;
  (d) keeping said wet channel wet so that as the secondary air stream flows through said wet channel, the secondary air stream can absorb moisture therefrom; and
  (e) supplying air to the apparatus by an air supply means so that as the ambient air stream passes through the dry channel, the ambient air stream is cooled by the dry channel and the dry channel means is cooled by the secondary air stream passing through and absorbing moisture from the wet channel.

7. The method of claim 1, wherein the range of about 40% to about 60% of the ambient air stream is redirected to the secondary air stream.

8. The method of claim 5, wherein about 50% of the ambient air stream is redirected to the secondary air stream.

9. The method of claim 6, further comprising a second heat exchanger, wherein said second heat exchange has a dry channel and a wet channel therethrough in heat exchange relationship therebetween, wherein said wet channel of said second heat exchanger is in communication with said dry channel of the apparatus.

10. The cooling apparatus of claim 1, in which said redirecting means comprises a heat exchanger plate between said wet and dry channels, said plate having a plurality of spaced openings formed therein along the path of the ambient air stream through which the ambient air passes.

* * * * *